United States Patent Office 2,961,426
Patented Nov. 22, 1960

2,961,426

COPOLYMERS OF o-ACRYLYL PHENOLS AND CHELATES THEREOF

Vaughn A. Engelhardt, Claymont Heights, and Hilmer E. Winberg, McDaniel Crest, Del., assignors to E. I. du Pont de Nemours and Company, Wilmington, Del., a corporation of Delaware No Drawing. Filed Jan. 5, 1956, Ser. No. 557,613

7 Claims. (Cl. 260—47)

This invention relates to a new class of polymeric materials. More particularly, it relates to new organic polymers containing chelate-forming structures and to the metal chelates of these polymers.

This invention has as an object the preparation of new polymeric materials. Another object is the preparation of new polymers containing a plurality of chelate-forming structures, otherwise called ligand functions. A further object is the preparation of polymers containing a plurality of ligand functions, i.e., polyligands having desirable polymer properties such as stability, toughness, flexibility in film form, and the like. Still another object is the preparation of metal chelates of such polyligands. A still further object is the preparation, by chelation, of cross-linked polymers. Other objects will appear hereinafter.

These objects are accomplished by the present invention of copolymers, with one or more addition polymerizable monoethylenically unsaturated monomers selected from the group consisting of acrylic and methacrylic acid esters of 1-6 carbon atom alkanols and cycloalkanols, acrylonitrile, methacrylamide, and styrene, of monohydric o-acrylylphenols, that is, of phenols having, in the ortho position relative to the phenolic hydroxyl, the radical

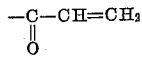

said copolymers containing, by weight, from about 3% to about 50% of the polymerized monohydric o-acrylylphenol. The invention also includes as new products the chelates of these copolymers with polyvalent metals.

The copolymers of this invention contain a multiplicity of recurring chelate-forming structures of the type (using o-acrylylphenol as the illustrative monomer)

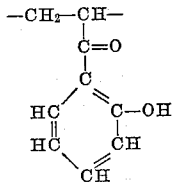

Such polymers are capable of forming with polyvalent metals chelated products, themselves polymeric, which are cross-linked through the six-membered chelate rings formed by the metal and the o-hydroxybenzoyl groups. To illustrate, with a divalent metal Me and poly(o-acrylylphenol), the resulting chelated polymer will be crosslinked through units of the type

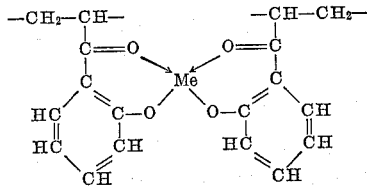

where the ring arrows represent coordinate linkages.

More complex spatial structures are formed when the chelating metal has a valence higher than two.

Of special utility, and therefore preferred, because of the superior properties of their metal chelates, are the copolymers of o-acrylylphenols with the alkyl or cycloalkyl esters, i.e., non-benzenoid hydrocarbyl esters, of acrylic acids of the formula

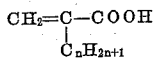

wherein $n$ is a cardinal number not greater than 1, i.e., of the type

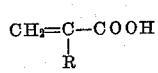

where R is hydrogen or methyl, and particularly such esters where the alcohol portion has one to six carbon atoms.

The monomeric o-acrylylphenols are suitably prepared by a three-step process involving (a) esterification of a phenol with β-chloropropionyl chloride, (b) isomerization of the ester with aluminum chloride to the o-(β-chloropropionyl)phenol (the Fries rearrangement); and (c) dehydrohalogenation with sodium acetate in alcohol to give the o-acrylylphenol. Examples of this synthesis are given below as Examples A, B, and C. The o-acrylylphenols which serve as starting materials for the copolymers of this invention can bear inert substituents, i.e., substituents having no polymerizing or chelating action. Such substituents include principally aliphatically saturated hydrocarbon radicals, i.e., hydrocarbon radicals free from non-benzenoid unsaturation, and particularly such radicals having from one to six carbon atoms; ether groups, e.g., alkoxy or aryloxy groups, and particularly such groups having from one to six carbon atoms; and halogen atoms (fluoro, chloro, bromo, or iodo groups).

EXAMPLE A

*o-Acrylyl-p-cresol*

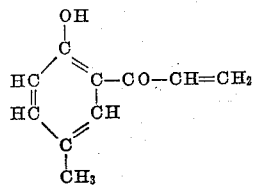

was prepared as follows: To 200 g. of freshly distilled p-cresol was added gradually 249 g. of β-chloropropionyl chloride, after which the temperature of the reaction mixture was raised to 100° C. and held at this point for one-half hour. The temperature was then increased slowly to 150° C., after which time the mixture was cooled and distilled. There was obtained 347 g. (94% yield) of p-cresyl β-chloropropionate, B.P. 94–98° C. at 1 mm. pressure, $n_D^{25}$ 1.5128.

*Analysis.*—Calculated for $C_{10}H_{11}O_2Cl$: C, 60.46%; H, 5.58%; Cl, 17.85%. Found: C, 60.96%; H, 5.50%; Cl, 18.03%.

A mixture of 83.5 g. of p-cresyl β-chloropropionate and 113.4 g. of anhydrous aluminum chloride was heated with stirring at 110° C. for two hours. The thick homogeneous syrup was cooled in an ice bath and carefully decomposed with 118 g. of concentrated hydrochloric acid in 300 ml. of ice water. There was obtained 73 g. (87% yield) of o-(β-chloropropionyl)-p-cresol, a solid melting at 63–64.5° C. after recrystallization from petroleum ether.

*Analysis.*—Calculated for $C_{10}H_{11}O_2Cl$: C, 60.46%; H, 5.58; Cl, 17.85%. Found: C, 60.50%; H, 5.70%; Cl, 17.78%.

A solution of 62 g. of o-(β-chloropropionyl)-p-cresol in 200 ml. of 95% ethanol was treated with 31 g. of freshly fused sodium acetate and refluxed for 1.5 hours. The reaction mixture was poured into 600 ml. of ice water, the oil was separated and the aqueous phase was extracted with ether. From the combined oil and extracts was obtained 29 g. (57% yield) of o-acrylyl-p-presol, B.P. 97–118° C. at 0.9–1.8 mm. On redistillation after stabilization with hydroquinone, this compound boiled at 88–92° C. at 1.0–1.3 mm. pressure.

*Analysis.*—Calculated for $C_{10}H_{10}O_2$: C, 74.05%; H, 6.22%. Found: C, 73.90%; H, 6.48%.

EXAMPLE B

*o-Acrylyl-p-tert.-butylphenol*

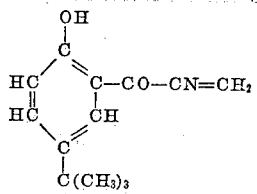

was prepared by the general procedure of Example A. The intermediates were p-tert.-butylphenyl β-chloropropionate, B.P. 108–109° C. at 0.4 mm., $n_D^{25}$ 1.5066, and o-(β-chloropropionyl)-p-tert.-butylphenol, B.P. 117–118° C. at 0.55 mm., $n_D^{25}$ 1.5150. A mixture of 10 g. of the latter with 4.15 g. of freshly fused sodium acetate and 28 g. of 95% ethanol was refluxed for 1.5 hours. The mixture was then poured into water and the oil separated. The water layer was extracted three times with ether, after which it gave no ferric chloride test. The ether extract was combined with the original oil and the ether solution was washed three times with water. The last water wash gave no chloride ion test. The ether solution was dried with magnesium sulfate and the solvent removed under reduced pressure. o-Acrylyl-p-tert.-butylphenol was obtained as a light yellow oil which gave a strong ferric chloride test in methanol. It could not be induced to crystallize, and decomposed on attempted distillation.

EXAMPLE C

*o-Acrylyl-o'-chloro-p-methylphenol*

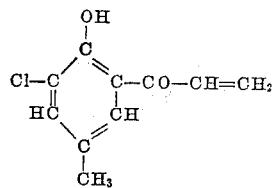

was prepared by the general procedure of Examples A and B. The intermediates were o-chloro-p-methylphenyl β-chloropropionate, B.P. 137° C. at 3.5 mm., and o-(β-chloropropionyl)-o'-chloro-p-methylphenol, M.P. 67–70.5° C. From the latter, o-acrylyl-o'-chloro-p-methylphenol was obtained and isolated as in Example B. On standing overnight at 4° C. this material crystallized, but melted below room temperature. It decomposed on attempted distillation.

Using the above described monomers or other suitable monohydric o-acrylylphenols, e.g., those of Geiger (Arch. Biochem. 16 426–7 and Padfield et al., J. Chem. Soc., 1950, 2276), the linear, metal-free copolymers of this invention are prepared, according to known methods, by polymerizing together in suitable proportions the o-acrylylphenol with one or more addition polymerizable monoethylenically unsaturated monomers selected from the group consisting of acrylic and methacrylic acid esters of 1–6 carbon atom alkanols and cycloalkanols, acrylonitrile, methacrylamide, and styrene. Particularly preferred monohydric acrylylphenols are those which have the one phenolic hydroxyl hydrogen as their only active (Zerewitenoff) hydrogen and have these hydroxyl and one carbonyl oxygen as their only oxygens.

The chelate crosslinked polymers which are also part of this invention are preferably prepared by the process of transchelation, i.e., by treating the o-acrylylphenol copolymer, containing a plurality of o-acrylylphenol units, with a chelate of a polyvalent metal with a volatile chelating agent, i.e., a chelating agent boiling below 300° C. at 760 mm. pressure, and evaporating the volatile chelating agent, thereby leaving a polymer crosslinked through metal chelate groups. What takes place in this process is a ligand exchange (organic compounds containing chelating structures being ligands), that is, a transfer of the metal from the chelating structure of the volatile chelating agent to those of the non-volatile polyligand. When the number $m$ of chelate-forming structures in the non-volatile polyligand and the principal valence $n$ of the metal are each at least two and the sum of $m$ and $n$ is at least five, a chelated polymer is formed and crosslinking through chelate rings takes place between the polymer molecules.

The outstanding advantage of the transchelation process just described is that the non-volatile polyligand and the polyvalent metal chelate of a volatile chelating agent can be combined in intimate admixtures, such as homogeneous solutions, without precipitation of the crosslinked, chelated polymer. Thus, these intimate mixtures can be formed, stored and handled at will, and it is only on removal of the volatile materials by evaporation that formation of the crosslinked polymer takes place. This is because an equilibrium between ligands and metal exists in the mixture, which equilibrium is shifted, with formation of the chelate crosslinked polymer, when the volatile ligand is removed.

When, as is normally the case, a shaped structure of the chelate crosslinked polymer is desired, the shaping is done essentially concurrently with the removal of the volatile chelating agent, e.g., by casting, extruding or pressing objects such as films, sheets, filaments, molded structures and the like, and completing the evaporation of the volatile materials as needed. In cases where the chelated composition is moldable at high temperatures, shaping may be accomplished subsequently to chelation.

The intimate mixture of the polymeric polyligand (that is, the o-acrylylphenol copolymer) and metal chelate of a volatile chelating agent need not be a homogeneous solution at room temperature. It is only necessary that its components form a homogeneous system at the temperature at which the shaped object is being formed. Additional inert solvents are not essential but are often used to aid in forming a solution. It is often desirable to add to the mixture a small additional amount of a volatile chelating agent, e.g., acetylacetone, as insurance against premature gelation of the chelate crosslinked polymer.

The relative proportions of o-acrylylphenol copolymer and polyvalent metal chelate of a volatile chelating agent can be such that there is present the calculated quantity of metal sufficient to chelate all the o-hydroxybenzoyl groups in the polyligand. Assuming complete chelation, this would yield, when the starting copolymer contains the maximum amount (50% by weight) of unsubstituted chelate-forming monomer, i.e., o-acrylylphenol itself, a chelated polymer containing about 0.17 gram atom of metal per 100 g. of polymer with divalent metals, and proportionately less with higher than divalent metals and with substituted o-acrylylphenols. However, in general, chelated polymers containing less than that amount of metal are preferred because of their greater flexibility and homogeneity. While the chelated polymers should contain at least 0.005 gram atom of metal per 100 grams of polymer weight to realize the benefits of crosslinking, it is preferred that they contain not more than 0.1, and still more preferably between about 0.01 and 0.06 gram atom of metal per 100 grams of polymer weight. The desired quantity of metal can be introduced either by reacting a polyligand containing relatively few o-hydroxybenzoyl groups with the calculated amount of metal chelate, or by reacting a polyligand richer in o-hydroxybenzoyl groups with less than the calculated amount of metal chelate.

The chelate crosslinked polymers of this invention are high softening and insoluble in the solvents in which the non-chelated polymers are soluble. They are, however, softened or even dissolved by chelating solvents.

The following examples in which parts are by weight are illustrative of the invention.

EXAMPLE I

A mixture of 8 g. of o-acrylyl-p-cresol, 32 g. of methyl methacrylate, 88 g. of benzene and 1.2 g. of benzoyl peroxide was held at 70–80° C. for nine hours under an atmosphere of nitrogen. There was obtained upon precipitation with methanol, 30.4 g. of an o-acrylyl-p-cresol/methyl methacrylate copolymer having an inherent viscosity of 0.17 in 0.1% benzene solution at 25° C., and containing 13.4% by weight of o-acrylyl-p-cresol, as indicated by carbon analysis. The copolymer could be pressed to clear, rigid films at 170° C.

A solution of this copolymer in benzene was treated with a benzene solution of tris(ethyl acetoacetato)-aluminum, used in amount of 0.33 mole per o-acrylyl-p-cresol group present in the polymer. This amount is theoretically sufficient to chelate all the o-hydroxybenzoyl groups since three such groups combine with one atom of aluminum. There was thus obtained a yellow solution which was stable for one week at room temperature and could be stabilized indefinitely by addition of a small amount of ethyl acetoacetate. Films cast from this solution on metal panels and baked 30 minutes at 150° C. to complete the removal of the volatile chelating agent were hard, glossy, and insoluble in benzene and other non-chelating solvents. These films consisted of a methyl methacrylate/o-acrylyl-p-cresol copolymer crosslinked through the chelate rings formed by the aluminum and the o-hydroxybenzoyl groups.

EXAMPLE II

A solution of 32.8 g. of methyl acrylate, 8.2 g. of o-acrylyl-p-cresol and 0.4 g. of azobis(isobutyronitrile) in 82 g. of benzene was heated for 16 hours at 70° C. under a nitrogen atmosphere. Precipitation with methanol followed by drying under reduced pressure at room temperature gave 32 g. of a soft resinous copolymer of methyl acrylate and o-acrylyl-p-cresol containing 12% by weight of the latter, as determined by carbon analysis.

This polymer in toluene solution was treated with an equivalent amount (0.33 mole per o-acrylyl-p-cresol group) of tris(ethyl acetoacetato)aluminum in toluene. The resulting solution, which was stable towards gelation for 12 hours, was cast on steel plates and the films after evaporation of the volatile chelating agent were baked for 30 minutes at 150° C. After this baking the films of methyl acrylate/o-acrylyl-p-cresol copolymer crosslinked through aluminum chelate rings had good resistance to toluene and other non-chelating solvents, were hard, had good impact toughness and were resistant to boiling water. Similar insoluble, hard films of a light green color were obtained by replacing the tris(ethyl acetoacetato)aluminum by bis(butyl acetoacetato)nickel.

EXAMPLE III

A mixture of 24 g. of methyl acrylate, 6 g. of o-acrylyl-p-tert.-butylphenol, 0.25 g. of azobis(isobutyronitrile) and 44 g. of benzene was heated at 70° C. for 24 hours under a nitrogen atmosphere. Upon precipitation with methanol there was obtained 22.7 g. of a soft, flexible copolymer of methyl acrylate and o-acrylyl-p-tert.-butylphenol, containing 26.8% by weight of the latter as determined by analysis for carbon. A benzene solution of this copolymer had a viscosity of 123 poises at 32% solids.

Hard films, insoluble in non-chelating solvents, of copolymer crosslinked through nickel chelate groups were obtained by treatment of the copolymer with bis(butyl acetoacetato)nickel as described in the above examples and baking to complete removal of the volatile chelating agent. Similarly, chelate crosslinking with aluminum through treatment of the copolymer with tris(ethyl acetoacetato)-aluminum gave solvent-resistant, hard films having good impact toughness.

EXAMPLE IV

A mixture of 24 g. of methyl acrylate, 6 g. of o-acrylyl-o'-chloro-p-cresol, 44 g. of benzene and 0.25 g. of azobis-(isobutyronitrile) was heated at 70° C. for 24 hours under a nitrogen atmosphere. Precipitation with methanol gave 20.6 g. of a soft, flexible copolymer of methyl acrylate and o-acrylyl-o'-chloro-p-cresol containing 27% by weight of the latter, as determined by carbon analysis. A benzene solution of this copolymer had a viscosity of 15 poises at 32% solids. Toluene solutions of this copolymer, when treated as described above with nickel or aluminum chelates of volatile chelating agents, gave coatings which became hard and resistant to non-chelating solvents upon air-drying or baking.

EXAMPLE V

A styrene/o-acrylyl-p-cresol copolymer containing 27% by weight of the latter was prepared by heating a solution of 18 g. of styrene, 6 g. of o-acrylyl-p-cresol and 0.24 g. of azobis(isobutyronitrile) in 44 g. of benzene at 65° C. for 14 hours. The copolymer, a pale yellow solid, was precipitated from this solution by addition of n-hexane. It had an inherent viscosity of 0.17 in 0.1% benzene solution at 25° C. It gave insoluble, chelate crosslinked polymers upon treatment with metal chelates, such as bis-(acetylacetono)copper, and evaporation of the volatile chelating agent, as described above.

EXAMPLE VI

A mixture of 9 g. of methacrylamide, 3 g. of o-acrylyl-p-cresol, 88 g. of benzene and 0.12 g. of azobis(isobutyronitrile) was heated at 65° C. for 14 hours. Precipitation with n-hexane followed by trituration and washing with ethyl acetate gave 8.5 g. of methacrylamide/o-acrylyl-p-cresol copolymer containing 81% by weight of polymerized methacrylamide, as shown by nitrogen analysis. This copolymer gave insoluble, chelate crosslinked polymers upon treatment with metal chelates such as tetrakis(ethyl acetoacetato)zirconium, as described above.

EXAMPLE VII

A solution of 12 g. of acrylonitrile, 3 g. of o-acrylyl-p-cresol, 88 g. of benzene and 0.12 g. of azobis(isobutyronitrile) was heated under nitrogen for 14 hours at 65° C. There was obtained an acrylonitrile/o-acrylyl-p-cresol copolymer containing 59% of acrylonitrile, as determined by nitrogen analysis. This copolymer gave insoluble, chelate crosslinked polymers by treatment, as described above, with metal chelates such as tris(acetylacetono)-aluminum and evaporation of the volatile chelating agent.

The present invention is generic to copolymers, with a second addition polymerizable, monoethylenically unsaturated monomer selected from the group consisting of acrylic and methacrylic acid esters of 1–6 carbon atom alkanols and cycloalkanols, acrylonitrile, methacrylamide, and styrene, of monohydric o-acrylylphenols, preferably having the phenolic hydrogen as the only Zerewitenoff active hydrogen and having but the two oxygens, the copolymer having 3–50%, of the o-acrylylphenol units. Suitable o-acrylylphenols in addition to those illustrated in the examples include o-acrylylphenol, o-acrylyl-p-bromophenol, o-acrylyl-o'-fluoro-p-methylphenol, o-acrylyl-m-cresol, o-acrylyl-p-(n-butyl)phenol, o-acrylyl-m,m'-dimethylphenol, o-acrylyl-m-methyl-m'-isopropylphenol, o-acrylyl-p-phenylphenol, o-acrylyl-p-(n-hexyl)phenol, o-acrlyl-m-cyclohexylphenol, o-acrylyl-p-methoxyphenol, o-acrylyl-p-(n-butoxy)phenol, o-acrylyl-p-(n-hexyloxy)-phenol, o-acrylyl-p-phenoxyphenol, etc.

These o-acrylylphenols can be polymerized with an addition polymerizable monoethylenically unsaturated monomer selected from the group consisting of acrylic and methacrylic acid esters of 1–6 carbon atoms alkanols and cycloalkanols, acrylonitrile, methacrylamide, and styrene including, for example, methyl acrylate, ethyl acrylate, n-butyl methacrylate, cyclohexyl methacrylate and n-hexyl acrylate.

With copolymers containing less than about 3% by weight of the o-acrylylphenol, the effects obtained by subsequent chelation become insufficient to produce marked changes in polymer properties. On the other hand, copolymers containing more than about 50% by weight of the o-acrylylphenol become increasingly brittle. Such polymers lack the pliability which is necessary in the polymer prior to chelation, since chelation results in increased stiffness. For these reasons, the copolymers contemplated by this invention are those which contain, by weight of the total polymeric composition, from about 3% to about 50%, and preferably from about 5% to about 35%, of polymerized o-acrylylphenol.

The copolymers of this invention can be prepared by known methods of polymerizing vinyl monomers, such as emulsion or solution polymerization, using known polymerization initiators of the free radical-producing type such as ammonium persulfate, hydrogen peroxide, organic peroxides, azonitriles, and the like. Under controlled conditions, it is possible to obtain in a reproducible manner copolymers of varying composition, depending upon the relative proportions of comonomers in the reaction medium. The copolymers are obtained as essentially colorless materials ranging in physical appearance from tough transparent resins to spongy solids. They have in general high molecular weights, as indicated by their inherent viscosity (determined in benzene solutions of 0.1% concentration at 25° C.) which normally is at least 0.1. The copolymers are generally soluble, either at room temperature or at elevated temperature, in a fairly wide variety of organic solvents including aromatic hydrocarbons such as benzene, toluene, the xylenes, tetrahydronaphthalene, ethers such as di-n-butyl ether, cyclic ethers such as tetrahydrofuran, ketones such as cyclohexanone, etc.

The copolymers of this invention, containing as they do, a plurality of o-hydroxybenzoyl groups, can be crosslinked through chelation with any chelating polyvalent metal. The polyvalent metals known to form chelates readily are listed in the book by Martell and Calvin entitled "Chemistry of the Metal Chelate Compounds" (Prentice-Hall, Inc., New York, (1952), particularly at p. 182). Preferred examples of metals suitable for chelation with the abovedescribed copolymers are aluminum and zirconium, because their chelates are colorless and have particularly good resistance to hydrolysis. Other very suitable metals are zinc, magnesium, and beryllium, whose chelates are also colorless; and titanium, copper, nickel and iron, when colored products are desired or not objectionable. Still other useful polyvalent metals include cobalt, manganese, chromium, cadmium, tin, scandium, vanadium, and bismuth.

For the purpose of preparing the chelate cross-linked polymers by transchelation, that is, reaction of the polymeric polyligand with a polyvalent metal chelate of a volatile chelating agent, any suitable chelating agent boiling below about 300° C. at 760 mm. will serve. The preferred ones are those most available and most economical, which are in general the 1,3-diketones, the β-ketoesters and the aromatic ortho-hydroxy aldehydes and esters. Specifically preferred chelating agents are acetylacetone, 3-methyl-2,4-pentanedione, 3-ethyl-2,4-pentanedione, propionylacetone, trifluoroacetylacetone, 2-furoylacetone, 2-thenoylacetone, ethyl acetoacetate, butyl acetoacetate, salicylaldehyde, methyl salicylate, and the like. Thus, there may be employed for reaction with the o-acrylylphenol copolymers the following representative polyvalent metal chelates of volatile chelating agents in addition to those illustrated in the examples: bis(ethyl acetoacetato)zinc; bis(acetylacetono)nickel; bis(ethyl acetoacetato)cobalt II; bis(ethyl acetoacetato)copper II; bis(salicylaldehydo)copper II; bis(acetylacetono)magnesium; tetrakis(ethyl acetoacetato)zirconium; tris(methyl salicylato)aluminum; bis(methyl salicylato)beryllium; bis(ethyl acetoacetato)magnesium; diisopropyl bis(ethyl acetoacetato)titanate IV; bis(acetylacetono)manganese II; tris(ethyl acetoacetato)iron III; tris(acetylacetono)iron III; bis(1,1,1-trifluoro-3-benzoylacetono)copper II; tris[2-(furoyl)acetono]aluminum; and the like.

As already mentioned, the polymeric polyligand should be treated with sufficient metal chelate to produce a final polymer containing at least 0.005 gram atom, and preferably from 0.01 to 0.06 gram atom of metal per 100 g. of chelated polymer. In this treatment and in the subsequent evaporation of the volatile chelating agent, no additional solvent is required in many cases, although an additional solvent may often be desirable to provide a solution of convenient viscosity for the purpose of producing shaped articles. The solvent can be any volatile liquid which is substantially inert towards the two components of the mixture or solution. Suitable organic solvents include aromatic hydrocarbons, e.g., benzene, toluene or the xylenes, aliphatic alcohols, e.g., methanol, ethanol, n-butanol, acyclic or cyclic ethers, e.g., di-n-butyl ether, tetrahydrofuran, ketones, e.g., methyl isobutyl ketone, cyclohexanone, and the like. The quantity of solvent is not critical and needs only be sufficient to decrease the viscosity of the composition to a level practical for film casting or similar uses. The mixtures or solutions so obtained are generally stable towards gelation for considerable periods of time. If some tendency to precipitation or gelation is noted on mixing the reactants, such tendency can be overcome by adding a slight excess of the volatile chelating agent, or of a different one having equivalent or greater chelating strength, to keep the chelated polymer in solution.

Shaped structures such as films cast from these compositions become tack-free rapidly upon air-drying, and even more rapidly upon baking, for example, at temperatures of 50 to 200° C. for from 15 minutes to two hours. These products consist of molecules of o-acrylylphenol copolymer crosslinked through the six-membered chelate rings formed by the polyvalent metal and the o-hydroxybenzoyl groups. The resulting shaped polymers are flexible, tough and resistant to long exposures to air and light.

The non-chelated, metal-free o-acrylylphenol copolymers are useful as films, sheets, coatings or moldings, particularly in applications where solvent resistance and heat resistance are not essential. For example, they are useful as wrapping materials for food products such as meat, cheese, fish or poultry, as book covers, flexible wire coatings, fabric coatings, electrical insulation and sponges.

The chelated copolymers are also useful in the form of films, sheets, coatings and moldings for the same applications listed for the unchelated polymers. However, they have the added advantages of resistance to heat and organic solvents and of enhanced strength. Specific uses for the chelated polymers include can liners, electrical tape, insulating materials for use at relatively high temperatures, fabric coatings, flexible materials for use in articles such as bags, hat covers, overshoes, and the like. They are further useful as reinforcement for plastics, as protective coatings for surfaces such as wood, porcelain and especially metals, e.g., refrigerators, autobodies, furniture, and the like, and in the manufacture by molding or extruding of shaped objects such as tumblers, tableware, chips, tubes, novelty articles, and the like.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A copolymer of a monohydric o-acrylylphenol wherein any other ring substituent is taken from the group consisting of halogen and alkoxy, aryloxy and hydrocarbon radicals having 1-6 carbon atoms and free from nonbenezoid unsaturation, with a second addition polymerizable monoethylenically unsaturated monomer selected from the group consisting of acrylic and methacrylic acid esters of 1-6 carbon atom alkanols and cycloalkanols, acrylonitrile, methacrylamide, and styrene, the copolymer containing 3-50% by weight of units of the o-acrylylphenol.

2. A copolymer of o-acrylyl-p-cresol with methyl methacrylate, the copolymer containing 3-50% by weight of units of the o-acrylyl-p-cresol.

3. A copolymer of o-acrylyl-p-tert.-butylphenol with methyl acrylate, the copolymer containing 3-50% by weight of units of the o-acrylyl-p-tert.-butylphenol.

4. A copolymer of o-acrylyl-p-cresol with acrylonitrile, the copolymer containing 3-50% by weight of units of the o-acrylyl-p-cresol.

5. A polyvalent metal chelate of the copolymer of claim 1 wherein said copolymer is cross-linked through said polyvalent metal present in six-membered chelate rings formed on different polymer chains, said metal being a common member of said chelate rings, each of said rings having an atom of the polyvalent metal linked to both the carbonylic and the phenolic oxygen atoms of a single o-hydroxybenzoyl unit and said co-polymer containing between 0.005 and 0.17 gram atom of the metal per 100 grams of polymer weight.

6. The polyvalent metal chelate of claim 5 wherein the chelating metal is aluminum.

7. The polyvalent metal chelate of claim 5 wherein the chelating metal is nickel.

References Cited in the file of this patent

UNITED STATES PATENTS

| | | |
|---|---|---|
| 1,901,354 | Meisenburg | Mar. 14, 1933 |
| 2,386,447 | Dreisbach | Oct. 9, 1945 |
| 2,415,796 | Lichty | Feb. 11, 1947 |
| 2,659,711 | Wilkens et al. | Nov. 17, 1953 |

OTHER REFERENCES

Geiger: Archives of Biochemistry, vol. 16, pp. 423-435, #3, March 1948.

Schildknecht: Vinyl & Related Polymers, 1952, Wiley & Sons Inc., N.Y., pages 696, 698.

UNITED STATES PATENT OFFICE
CERTIFICATION OF CORRECTION

Patent No. 2,961,426                                  November 22, 1960

Vaughn A. Engelhardt et al.

It is hereby certified that error appears in the above numbered patent requiring correction and that the said Letters Patent should read as corrected below.

Column 3, line 7, for "o-acrylyl-p-presol" read -- o-acrylyl-p-cresol --; lines 16 to 23, the formula should appear as shown below instead of as in the patent:

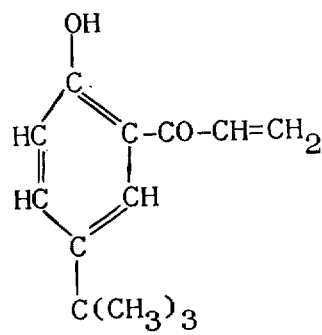

column 7, line 2, for "o-acrlyl-m-" read -- o-acrylyl-m- --.

Signed and sealed this 6th day of June 1961.

Attest:
ERNEST W. SWIDER
Attesting Officer

DAVID L. LADD
Commissioner of Patents